United States Patent
Arndt et al.

(10) Patent No.: US 12,531,221 B2
(45) Date of Patent: Jan. 20, 2026

(54) SYSTEMS AND METHOD FOR IMAGE AND/OR VIDEO PROCESSING OF MASS SPECTROMETRY DATA

(71) Applicant: MOBILion Systems, Inc., Chadds Ford, PA (US)

(72) Inventors: James Russel Arndt, Downingstown, PA (US); John Daniel DeBord, West Grove, PA (US)

(73) Assignee: MOBILion Systems, Inc., Chadds Ford, PA (US)

( * ) Notice: Subject to any disclaimer, the term of this patent is extended or adjusted under 35 U.S.C. 154(b) by 436 days.

(21) Appl. No.: 18/037,458

(22) PCT Filed: Nov. 16, 2021

(86) PCT No.: PCT/US2021/059565
§ 371 (c)(1),
(2) Date: May 17, 2023

(87) PCT Pub. No.: WO2022/108942
PCT Pub. Date: May 27, 2022

(65) Prior Publication Data
US 2023/0420234 A1    Dec. 28, 2023

Related U.S. Application Data

(60) Provisional application No. 63/114,749, filed on Nov. 17, 2020.

(51) Int. Cl.
*H01J 49/00* (2006.01)
*G01N 27/623* (2021.01)
*G06T 11/20* (2006.01)

(52) U.S. Cl.
CPC ........ *H01J 49/0004* (2013.01); *G01N 27/623* (2021.01); *G06T 11/206* (2013.01); *H01J 49/0036* (2013.01)

(58) Field of Classification Search
CPC ........ H01J 49/00; H01J 49/02; H01J 49/0036; H01J 49/0004; G06V 10/751; G06T 11/206; G06F 2218/12; G01N 27/623
(Continued)

(56) References Cited

U.S. PATENT DOCUMENTS 6,539,106 B1 * 3/2003 Gallarda .............. G06V 10/987
                                                    382/286
7,456,394 B2   11/2008 Cameron et al.
(Continued)

FOREIGN PATENT DOCUMENTS

EP    2140270 B1    12/2014
GB    2579993 A      7/2020
(Continued)

OTHER PUBLICATIONS

PCT Invitation to Pay Additional Fees dated Jan. 13, 2022, in connection with Int'l App. No. PCT/US21/59565 (2 pages).
(Continued)

*Primary Examiner* — Jason L Mccormack
(74) *Attorney, Agent, or Firm* — McCarter & English, LLP

(57) ABSTRACT

Systems and methods for image and/or video processing of mass spectrometry data comprise a processor in communication with a storage device, and computer system code executed by the processor that causes the processor to perform an image or video analysis comparison between a second data plot image or video to a first data plot image or video, and generate a delta dataset based on the comparison. The delta dataset is representative of the differences between the first and second data plots. In additional systems and methods the computer system code can perform an image or video analysis comparison between the first and second data plots and a reference data plot, generate first and second
(Continued)

delta datasets based on the comparisons, which are representative of the differences between the first and second data plots and the reference data plot, and perform a statistical analysis on the first and second delta datasets.

28 Claims, 9 Drawing Sheets

(58) Field of Classification Search
USPC .................................................. 250/281, 282
See application file for complete search history.

(56) References Cited

U.S. PATENT DOCUMENTS

| | | | |
|---|---|---|---|
| 8,487,240 | B2 | 7/2013 | Koehl |
| 8,581,178 | B2 | 11/2013 | Miller et al. |
| 8,835,839 | B1 | 9/2014 | Anderson et al. |
| 9,429,543 | B2 | 8/2016 | Jiang et al. |
| 9,482,642 | B2 | 11/2016 | Mordehai et al. |
| 9,939,409 | B2 | 4/2018 | Ibrahim et al. |
| 10,074,525 | B2 | 9/2018 | Collings et al. |
| 10,241,079 | B2 | 3/2019 | Betz et al. |
| 10,317,362 | B2 | 6/2019 | Harder et al. |
| 10,317,364 | B2 | 6/2019 | Garimella et al. |
| 10,408,792 | B2 | 9/2019 | Betz et al. |
| 10,473,620 | B2 | 11/2019 | Harder et al. |
| 10,522,337 | B2 | 12/2019 | Rizzo et al. |
| 10,847,354 | B2 | 11/2020 | Cleland et al. |
| 10,852,275 | B2 | 12/2020 | Richardson et al. |
| 10,867,779 | B2 | 12/2020 | Richardson et al. |
| 10,879,058 | B2 | 12/2020 | Richardson et al. |
| 2011/0228970 | A1 | 9/2011 | Kajihara et al. |
| 2012/0025070 | A1 | 2/2012 | Miller et al. |
| 2013/0092831 | A1* | 4/2013 | Kyogaku ............ H01J 49/0004 250/288 |
| 2015/0160162 | A1 | 6/2015 | Darland et al. |
| 2016/0203963 | A1 | 7/2016 | Green |
| 2017/0073756 | A1 | 3/2017 | Jensen et al. |
| 2017/0345634 | A1 | 11/2017 | Orton et al. |
| 2017/0350861 | A1* | 12/2017 | Harder ............... G01N 30/7233 |
| 2019/0333748 | A1* | 10/2019 | Takahashi ............. H05H 1/463 |
| 2019/0348268 | A1 | 11/2019 | Hamid et al. |
| 2020/0161119 | A1 | 5/2020 | Richardson et al. |
| 2020/0326303 | A1 | 10/2020 | Richardson et al. |

FOREIGN PATENT DOCUMENTS

| | | |
|---|---|---|
| WO | 2020/212877 A1 | 10/2020 |
| WO | 2022/108942 A1 | 5/2022 |

OTHER PUBLICATIONS

PCT International Search Report and Written Opinion dated Mar. 10, 2022, in connection with Int'l App. No. PCT/US21/59565 (12 pages).

Cranney et al., "CsoDIAq Software for Direct Infusion Shotgun Proteome Analysis (DISPA)," DOI: 10.1101/2021.05.12.443833, May 13, 2021 (11 pages).

Donohoe, et al., "A New Ion Mobility-Linear Ion Trap Instrument for Complex Mixture Analysis," Anal. Chem., vol. 86, Iss. 16, pp. 8121-8128, Aug. 19, 2014 (17 pages).

Ibrahim et al., "Development of a New Ion Mobility (Quadrupole) Time-of-Flight Mass Spectrometer," Int'l Journal of Mass Spectrometry, 377 (2015) 655-662, Jul. 28, 2014 (8 pages).

Meyer et al., "Quantitative Shotgun Proteome Analysis by Direct Infusion," Nature Methods, DOI: 10.1038/s41592-020-00999-z, Nov. 23, 2020 (26 pages).

Valentine et al., "Gas-Phase Separations of Protease Digests," J. Am. Soc. Mass. Spectrom, vol. 9, Issue 11, 1213-1216, Aug. 6, 1998 (4 pages).

Wu et al., "Separation of Isomeric Peptides Using Electrospray Ionization/High-Resolution Ion Mobility Spectrometry," Anal. Chem., vol. 72, Iss. 2, pp. 391-395, Jan. 15, 2000 (Abstract only—1 page).

* cited by examiner

SYSTEMS AND METHOD FOR IMAGE AND/OR VIDEO PROCESSING OF MASS SPECTROMETRY DATA

CROSS-REFERENCE TO RELATED APPLICATIONS

The present application is a 35 U.S.C. § 371 National Stage filing of International Application No. PCT/US2021/059565, filed on Nov. 16, 2021, which claims the benefit of priority to U.S. Provisional Patent Application No. 63/114,749, filed on Nov. 17, 2020, is the contents of each of these applications are herein incorporated by reference in their entirety.

TECHNICAL FIELD

The present disclosure relates generally to the field of mass spectrometry (MS) data analysis. More specifically, the present disclosure relates to systems and methods for image and/or video processing of mass spectrometry data to determine differences between sample sets.

RELATED ART

MS is an analytical technique that can separate a mixture of chemical species based on their mass-to-charge ratio. MS involves ionizing the mixture of chemical species followed by acceleration of the ion mixture in the presence of electric and/or magnetic fields. In some mass spectrometers, ions having the same mass-to-charge ratio undergo the same deflection or time dependent response. Ions with different mass-to-charge ratios can undergo different deflections or time dependent response, and can be identified based on the spatial or temporal position of detection by a detector (e.g., electron multiplier).

Different techniques can be used to separate sample components or ions prior to undergoing MS analysis by a mass spectrometry acquisition system, such as a time of flight (TOF) mass spectrometer. For example, ion mobility spectrometry (IMS), which is a technique for separating and identifying ions in the gaseous phase based on their mobilities, can be employed to separate structural isomers and macromolecules that have different mobilities. IMS relies on applying a constant or a time-varying electric field to a mixture of ions within a static or dynamic background gas. An ion having a larger mobility (or smaller collision cross section [CCS]) moves faster under the influence of the electric field compared to an ion with a smaller mobility (or larger CCS). By applying the electric field over a separation distance (e.g., in a drift tube) of an IMS device, ions from an ion mixture can be temporally or spatially separated based on their mobility. Because ions with different mobilities arrive at the end of the drift tube at different times (temporal separation) they can be identified based on the time of detection by a detector at the end of the drift tube. Resolution of the mobility separation can be varied by changing the separation distance.

IMS combined with MS can generate an IMS-MS spectrum that can be used in a broad range of applications, including metabolomics, glycomics, lipidomics, and proteomics. IMS-MS analysis can be performed by coupling an ion mobility spectrometer with a mass spectrometer. For example, an ion mobility spectrometer can first separate the ions based on their mobility. Ions having different mobilities can arrive at the mass spectrometer at different times, and are then separated based on their mass-to-charge ratio. One example of an IM spectrometer is a structure for lossless ion manipulations (SLIM) device that can generate an IMS spectrum with minimal ion loss. SLIM devices can use traveling wave separation as one technique to separate ions of different mobilities.

IMS-MS data can be expressed and visualized as a three-dimensional array or plot with mass-to-charge ratio (m/z) and arrival time as the y- and x-axes (interchangeably) and peak intensity binned to a color map. That is, each point on an x-y plot of m/z versus arrival time can have a different color that corresponds to the peak intensity at that coordinate as detected by the mass spectrometry data acquisition system. This type of data plot can be useful in identifying compound classes since compound classes tend to group to distinct regions of the m/z versus arrival time space. However, while this presentation is particular useful for data visualization, it generally has less utility in processing and parsing data, e.g., of multiple sample sets.

Additionally, liquid chromatography (LC) can be used in conjunction with IMS-MS techniques. In such a configuration, a sample can undergo a first separation during the LC process, and then be transferred to an IM spectrometer, e.g., a SLIM device, to undergo IMS separation and subsequently MS analysis by a mass spectrometry acquisition system. Once the analysis is complete, the liquid chromatography data can be added to the IMS-MS data so that the LC-IMS-MS data is expressed and visualized as a four-dimensional array or plot. For example, the IMS-MS data can be divided into time slices, and the corresponding LC data applied to each time slice.

Moreover, IM-MS data processing can be cumbersome, and the ability to quickly and clearly identify features and differences between sample sets can be difficult, which can prohibit the analysis of large sample sets. Some systems exist for analyzing mass spectrometry data, however, they are generally specific to gas chromatography (GC) or LC-MS data and do not adequately incorporate the ion mobility dimension. While some of the foregoing systems do support the additional ion mobility dimension, storage and processing of the resultant four dimensional data sets (e.g., LC, IMS, MS, and intensity) can be cumbersome and highly inefficient, ultimately reducing the utility and usability of the technique. For example, a typical twenty minute LC-IMS-MS data set can have upwards of 320,000 data points in the TOF dimension, 10,000 data points in the IMS dimension, and 750 data points in the LC dimension, which would result in a data matrix having nearly $2.4 \times 10^{12}$ data points. To store the full resolution of this data matrix, e.g., without filtering or data suppression and with each data point stored as a 16-bit (2 byte) integer, one might need upwards of 4.8 terabytes of storage. Even if one were to suppress all of the elements within the data matrix that are zero, they may still require tens or hundreds of megabytes of storage.

Additionally, some of the foregoing existing systems generally employ the ion mobility measurement simply as a filtering criterion, rather than as a fully independent separation dimension, due to computational limitations of the corresponding analysis system. In this way, utilization of the accessible functionality of the IMS dimension is hindered by the computational limitations of the analysis system. This half treatment of the IMS dimension is largely a result of the limited analytical resolution of previous IMS technologies, but the recent introduction of various high resolution IMS systems warrant a full treatment of the ion mobility data as a primary characteristic in data processing.

Moreover, other systems typically function either in an application specific or application agnostic manner. In the application specific case, a target analyte library can guide the system as to which particular ranges of data points are important for the analysis, which can result in the computational requirements being reduced because only a subset of the raw data must be analyzed. In the application agnostic approach, peak/feature finding routines and compound identification processes are some analytical techniques that can be implemented, however, they can be computationally intensive given the large size and multidimensional nature of the data.

Accordingly, there is a need for systems and methods that make IMS-MS data more easily digestible and enable the analysis of large sample sets and cohorts.

SUMMARY

The present disclosure relates to systems and methods for image and/or video processing of mass spectrometry data.

In accordance with embodiments of the present disclosure, a system for image processing of mass spectrometry data includes an ion mobility separation device, an ion detector, and a computer system. The ion mobility separation device is configured to receive a first sample of ions, guide the ions of the first sample through the ion mobility separation device, separate the ions of the first sample based on ion mobility, receive a second sample of ions, guide the ions of the second sample through the ion mobility separation device, and separate the ions of the second sample based on ion mobility. The ion detector is configured to receive the ions of the first sample from the ion mobility separation device, detect the ions of the first sample, generate first input data based on the detected ions of the first sample, receive the ions of the second sample from the ion mobility separation device, detect the ions of the second sample, and generate second input data based on the detected ions of the second sample. The computer system is configured to generate a first data plot based on the first input data, generate a second data plot based on the second input data, compare the second data plot to the first data plot, and generate a delta dataset based on the comparison of the second data plot to the first data plot. The delta dataset is representative of the differences between the second data plot and the first data plot. Additionally, the first data plot is a first image or a first video while the second data plot is a second image or a second video, such that the computer system is configured to compare the second data plot to the first data plot by performing an image analysis.

In some aspects, the first input data can be a first three-dimensional data array or four-dimensional data array, and the second input data can be a second three-dimensional data array or four-dimensional data array. In other aspects, the first and second data plots can be plots of mass-to-charge ratio versus arrival time with peak intensity binned to a color map.

In other aspects, the computer system can be configured to perform a pixel-by-pixel comparison between the second data plot and the first data plot.

Additionally, in other aspects the computer system can include a plotting module configured to generate the first data plot and the second data plot and/or an image/video analysis module configured to compare the second data plot to the first data plot.

In still other aspects, the computer system can be configured to calibrate one or more of the first data plot and the second data plot.

In other aspects, the first input data can be divided into a first plurality of groupings and the second input data can be divided into a second plurality of groupings. The computer system can be configured to generate the first data plot based on at least one grouping of the first plurality of groupings and generate the second data plot based on at least one grouping of the second plurality of groupings. In such aspects, the first video can be a combination of the first plurality of groupings with each grouping of the first plurality of groupings being at least one frame of the first video, and the second video can be a combination of the second plurality of groupings with each grouping of the second plurality of groupings being at least one frame of the second video.

In some aspects, the system can include a liquid chromatography device configured to receive a first sample, chemically separate the first sample, receive a second sample, and chemically separate the second sample. In these aspects the first sample of ions received by the ion mobility separation device can be generated from the chemically separated first sample, and the second sample of ions received by the ion mobility separation device can be generated from the chemically separated first sample.

In accordance with embodiments of the present disclosure, a system for image processing of mass spectrometry data includes a processor in communication with a storage device, and computer system code executed by the processor. The computer system code causes the processor to generate a first data plot based on first input data related to a first sample of ions, generate a second data plot based on second input data related to a second sample of ions, compare a second data plot to a first data plot, and generate a delta dataset based on the comparison of the second data plot to the first data plot. The delta dataset is representative of the differences between the second data plot and the first data plot. Additionally, the first data plot is a first image or a first video while the second data plot is a second image or a second video, such that the comparison performed by the computer system code is an image or video analysis comparison.

In some aspects, the first input data can be a first three-dimensional data array or four-dimensional data array, and the second input data can be a second three-dimensional data array or four-dimensional data array. In other aspects, the first and second data plots can be plots of mass-to-charge ratio versus arrival time with peak intensity binned to a color map.

In other aspects, the computer system code can compare the second data plot to the first data plot on a pixel-by-pixel basis.

In still other aspects, the system can include an ion mobility separation device and an ion detector. In such aspects, the ion mobility separation device can be configured to receive a first sample of ions, guide the ions of the first sample through the ion mobility separation device, separate the ions of the first sample based on ion mobility, receive a second sample of ions, guide the ions of the second sample through the ion mobility separation device, and separate the ions of the second sample based on ion mobility. Additionally, the ion detector can be configured to receive the ions of the first sample from the ion mobility separation device, detect the ions of the first sample, generate first input data based on the detected ions of the first sample, receive the ions of the second sample from the ion mobility separation device, detect the ions of the second sample, and generate second input data based on the detected ions of the second sample.

In some aspects, the system can include a liquid chromatography device configured to receive a first sample, chemically separate the first sample, receive a second sample, and chemically separate the second sample. In these aspects the first sample of ions received by the ion mobility separation device can be generated from the chemically separated first sample, and the second sample of ions received by the ion mobility separation device can be generated from the chemically separated first sample.

In other aspects, the first input data can be divided into a first plurality of groupings and the second input data can be divided into a second plurality of groupings. The computer system code can be configured to cause the processor to generate the first data plot based on at least one grouping of the first plurality of groupings and generate the second data plot based on at least one grouping of the second plurality of groupings. In such aspects, the first video can be a combination of the first plurality of groupings with each grouping of the first plurality of groupings being at least one frame of the first video, and the second video can be a combination of the second plurality of groupings with each grouping of the second plurality of groupings being at least one frame of the second video.

According to embodiments of the present disclosure, a method for image processing of mass spectrometry data includes generating a first data plot based on first input data related to a first sample of ions and generating a second data plot based on second input data related to a second sample of ions. The first data plot is a first image or a first video, while the second data plot is a second image or a second video. The method also involves comparing the second data plot to the first data plot by performing an image analysis or video analysis comparison. The method further involves generating a delta dataset based on the comparison of the second data plot to the first data plot, where the delta dataset is representative of the differences between the second data plot and the first data plot.

In some aspects, the first input data can be a first three-dimensional data array or four-dimensional data array, and the second input data can be a second three-dimensional data array or four-dimensional data array. In such aspects, the first and second data plots can be plots of mass-to-charge ratio versus arrival time with peak intensity binned to a color map.

In some other aspects, the step of comparing the second data plot to the first data plot can include comparing the second data plot to the first data plot on a pixel-by-pixel basis.

In still other aspects, the method can involve receiving the first sample of ions by an ion mobility separation device, guiding the ions of the first sample through the ion mobility separation device, separating the ions of the first sample based on ion mobility, receiving the ions of the first sample at an ion detector, detecting the ions of the first sample by the ion detector, and generating the first input data based on the detected ions of the first sample. Such aspects can also involve receiving the second sample of ions by an ion mobility separation device, guiding the ions of the second sample through the ion mobility separation device, separating the ions of the second sample based on ion mobility, receiving the ions of the second sample at the ion detector, detecting the ions of the second sample by the ion detector, and generating the second input data based on the detected ions of the second sample.

In other aspects, the method can involve chemically separating a first sample with a liquid chromatography device and chemically separating a second sample with the liquid chromatography device. The first sample of ions received by the ion mobility separation device can be generated from the chemically separated first sample, and the second sample of ions received by the ion mobility separation device can be generated from the chemically separated first sample.

Additionally, the first input data can be divided into a first plurality of groupings and the second input data can be divided into a second plurality of groupings. In such instances, the method can further involve generating the first data plot based on at least one grouping of the first plurality of groupings and generating the second data plot based on at least one grouping of the second plurality of groupings. The first video can be a combination of the first plurality of groupings with each grouping of the first plurality of groupings being at least one frame of the first video, and the second video can be a combination of the second plurality of groupings with each grouping of the second plurality of groupings being at least one frame of the second video.

A system for image processing of mass spectrometry data includes an ion mobility separation device, an ion detector, and a computer system. The ion mobility separation device is configured to receive a first sample of ions, guide the ions of the first sample through the ion mobility separation device, separate the ions of the first sample based on ion mobility, receive a second sample of ions, guide the ions of the second sample through the ion mobility separation device, and separate the ions of the second sample based on ion mobility. The ion detector is configured to receive the ions of the first sample from the ion mobility separation device, detect the ions of the first sample, generate first input data based on the detected ions of the first sample, receive the ions of the second sample from the ion mobility separation device, detect the ions of the second sample, and generate second input data based on the detected ions of the second sample. The computer system is configured to generate a first data plot based on the first input data, generate a second data plot based on the second input data, compare the first data plot to a reference data plot, generate a first delta dataset based on the comparison of the first data plot to the reference data plot, generate a second delta dataset based on the comparison of the second data plot to the reference data plot, perform a statistical analysis on the first delta dataset and the second delta dataset, and generate output data based on the statistical analysis. The first delta dataset is representative of the differences between the first data plot and the reference data plot, and the second delta dataset is representative of the differences between the second data plot and the reference data plot. Additionally, the first data plot is a first image or a first video, the second data plot is a second image or a second video, the reference data plot is a third image or a third video, and the computer system is configured to compare the first data plot to the reference data plot by performing an image analysis or a video analysis and compare the second data plot to the reference data plot by performing an image analysis or a video analysis.

In some aspects, the statistical analysis can be a principal component analysis. In other aspects, the statistical analysis can determine the portions of the first data plot and the second data plot that are most significantly different from the reference data plot.

In some aspects, the first input data is a first three-dimensional data array or four-dimensional data array, and the second input data is a second three-dimensional data array or four-dimensional data array. In other aspects, the first and second data plots can be plots of mass-to-charge ratio versus arrival time with peak intensity.

In other aspects, the computer system can be configured to perform a pixel-by-pixel comparison between the first data plot and the reference data plot, and between the second data plot and the reference data plot.

Additionally, in other aspects the computer system can include a plotting module configured to generate the first data plot and the second data plot, an image/video analysis module configured to compare the first and second data plots to the reference data plot, and/or a statistical analysis module configured to perform the statistical analysis on the first delta dataset and the second delta dataset.

In still other aspects, the computer system can be configured to calibrate one or more of the first data plot and the second data plot.

In other aspects, the first input data can be divided into a first plurality of groupings and the second input data can be divided into a second plurality of groupings. The computer system can be configured to generate the first data plot based on at least one grouping of the first plurality of groupings and generate the second data plot based on at least one grouping of the second plurality of groupings. In such aspects, the first video can be a combination of the first plurality of groupings with each grouping of the first plurality of groupings being at least one frame of the first video, and the second video can be a combination of the second plurality of groupings with each grouping of the second plurality of groupings being at least one frame of the second video.

In some aspects, the system can include a liquid chromatography device configured to receive a first sample, chemically separate the first sample, receive a second sample, and chemically separate the second sample. In these aspects the first sample of ions received by the ion mobility separation device can be generated from the chemically separated first sample, and the second sample of ions received by the ion mobility separation device can be generated from the chemically separated first sample.

In accordance with embodiments of the present disclosure, a system for image processing of mass spectrometry data includes a processor in communication with a storage device, and computer system code executed by the processor. The computer system code causes the processor to generate a first data plot based on first input data related to a first sample of ions, generate a second data plot based on second input data related to a second sample of ions, compare the first data plot to a reference data plot, generate a first delta dataset based on the comparison of the first data plot to the reference data plot, compare the second data plot to the reference data plot, generate a second delta dataset based on the comparison of the second data plot to the reference data plot, perform a statistical analysis on the first delta dataset and the second delta dataset, and generate output data based on the statistical analysis. The first delta dataset is representative of the differences between the first data plot and the reference data plot, and the second delta dataset is representative of the differences between the second data plot and the reference data plot. Additionally, the first data plot is a first image or a first video, the second data plot is a second image or a second video, and the reference data plot is a third image or a third video, such that the comparisons performed by the computer system code are image analysis or video analysis comparisons.

In some aspects, the statistical analysis can be a principal component analysis. In other aspects, the statistical analysis can determine the portions of the first data plot and the second data plot that are most significantly different from the reference data plot.

In certain aspects, wherein the first input data is a first three-dimensional data array or four-dimensional data array, and the second input data is a second three-dimensional data array or four-dimensional data array. In such aspects, the first and second data plots can be plots of mass-to-charge ratio versus arrival time with peak intensity binned to a color map.

In some aspects, the computer system code can compare the first data plot to the reference data plot on a pixel-by-pixel basis, and compare the second data plot to the reference data plot on a pixel-by-pixel basis.

In still other aspects, the system can include an ion mobility separation device and an ion detector. The ion mobility separation device can be configured to receive a first sample of ions, guide the ions of the first sample through the ion mobility separation device, separate the ions of the first sample based on ion mobility, receive a second sample of ions, guide the ions of the second sample through the ion mobility separation device, and separate the ions of the second sample based on ion mobility. The ion detector can be configured to receive the ions of the first sample from the ion mobility separation device, detect the ions of the first sample, generate first input data based on the detected ions of the first sample, receive the ions of the second sample from the ion mobility separation device, detect the ions of the second sample, and generate second input data based on the detected ions of the second sample.

In some aspects, the system can include a liquid chromatography device configured to receive a first sample, chemically separate the first sample, receive a second sample, and chemically separate the second sample. In these aspects the first sample of ions received by the ion mobility separation device can be generated from the chemically separated first sample, and the second sample of ions received by the ion mobility separation device can be generated from the chemically separated first sample.

In other aspects, the first input data can be divided into a first plurality of groupings and the second input data can be divided into a second plurality of groupings. The computer system code can be configured to cause the processor to generate the first data plot based on at least one grouping of the first plurality of groupings and generate the second data plot based on at least one grouping of the second plurality of groupings. In such aspects, the first video can be a combination of the first plurality of groupings with each grouping of the first plurality of groupings being at least one frame of the first video, and the second video can be a combination of the second plurality of groupings with each grouping of the second plurality of groupings being at least one frame of the second video.

A method for image processing of mass spectrometry data according to the present disclosure includes generating a first data plot based on first input data related to a first sample of ions, the first data plot being a first image or a first video, and generating a second data plot based on second input data related to a second sample of ions, the second data plot being a second image or a second video. The method also involves comparing the first data plot to a reference data plot and generating a first delta dataset based on the comparison of the first data plot to the reference data plot, where the first delta dataset is representative of the differences between the first data plot and the reference data plot. The method further involves comparing the second data plot to the reference data plot and generating a second delta dataset based on the comparison of the second data plot to the reference data plot, where the second delta dataset is representative of the differences between the second data plot and the reference data plot. The method additionally involves performing a statistical analysis on the first delta dataset and the second delta dataset, and generating output data based on the statistical analysis.

In some aspects, the statistical analysis can be a principal component analysis. In some other aspects, the statistical analysis can determine the portions of the first data plot and the second data plot that are most significantly different from the reference data plot.

In other aspects, the first input data is a first three-dimensional data array or four-dimensional data array, and the second input data is a second three-dimensional data array or four-dimensional data array. In such aspects, the first and second data plots can be plots of mass-to-charge ratio versus arrival time with peak intensity binned to a color map.

In some aspects, the step of comparing the first data plot to the reference data plot can include comparing the first data plot to the reference data plot on a pixel-by-pixel basis, and the step of comparing the second data plot to the reference data plot includes comparing the second data plot to the reference data plot on a pixel-by-pixel basis.

In still other aspects, the method can involve the steps of receiving the first sample of ions by an ion mobility separation device, guiding the ions of the first sample through the ion mobility separation device, separating the ions of the first sample based on ion mobility, receiving the ions of the first sample at an ion detector, and detecting the ions of the first sample by the ion detector. The method can also involve generating the first input data based on the detected ions of the first sample. The method can additionally involve the steps of receiving the second sample of ions by the ion mobility separation device, guiding the ions of the second sample through the ion mobility separation device, separating the ions of the second sample based on ion mobility, receiving the ions of the second sample at the ion detector, and detecting the ions of the second sample by the ion detector. This method can also involve generating second input data based on the detected ions of the second sample.

In other aspects, the method can involve chemically separating a first sample with a liquid chromatography device and chemically separating a second sample with the liquid chromatography device. The first sample of ions received by the ion mobility separation device can be generated from the chemically separated first sample, and the second sample of ions received by the ion mobility separation device can be generated from the chemically separated first sample.

Additionally, the first input data can be divided into a first plurality of groupings and the second input data can be divided into a second plurality of groupings. In such instances, the method can further involve generating the first data plot based on at least one grouping of the first plurality of groupings and generating the second data plot based on at least one grouping of the second plurality of groupings. The first video can be a combination of the first plurality of groupings with each grouping of the first plurality of groupings being at least one frame of the first video, and the second video can be a combination of the second plurality of groupings with each grouping of the second plurality of groupings being at least one frame of the second video.

Other features will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

The foregoing features of the present disclosure will be apparent from the following Detailed Description of the Invention, taken in connection with the accompanying drawings, in which.

DETAILED DESCRIPTION

The present disclosure relates to systems and methods for image and/or video processing of mass spectrometry data to determine differences between sample sets, as described in detail below in connection with FIGS. 1-6.

Figure 1:
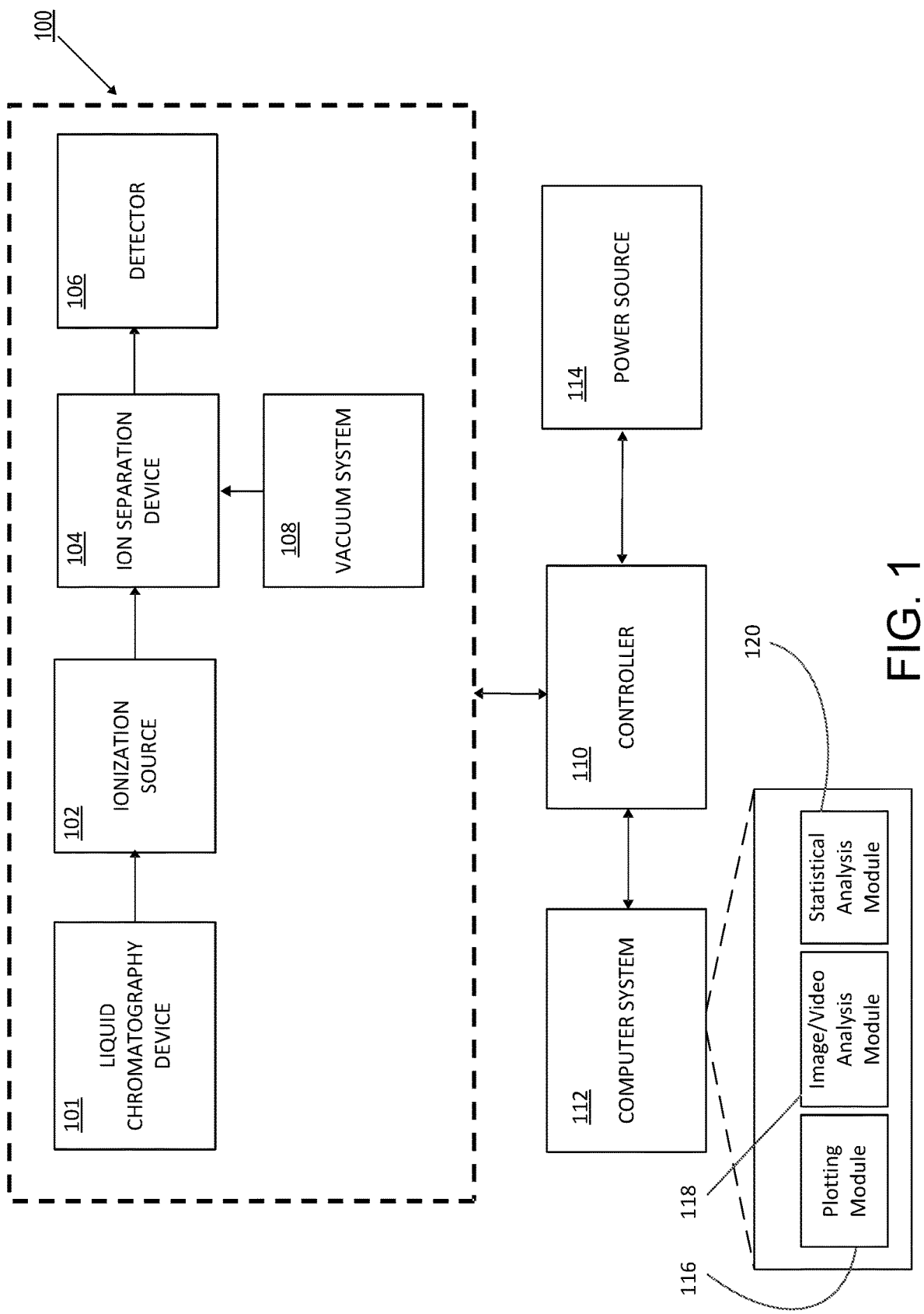
FIG. 1 is a schematic diagram of an exemplary ion mobility separation system of the present disclosure.

FIG. 1 is a schematic diagram of an exemplary ion mobility separation (IMS) system 100 in accordance with the present disclosure. The IMS system 100 includes an optional liquid chromatography (LC) device 101, an ionization source 102, an ion separation device 104, a detector 106 (e.g., a mass spectrometer such as a time of flight (TOF) mass spectrometer), a vacuum system 108, a controller 110, a computer system 112, and a power source 114.

The LC device 101 is an optional component that can be incorporated into the IMS system 100 to perform an initial separation procedure prior to IMS separation. In particular, the LC device 101 can be a high-performance LC device or a low-pressure LC device that receives a sample mixture and separates the components, e.g., analytes, of the sample as it passes there through. The LC device 101 can provide LC data for the sample, such as retention times for the analytes of the sample. This LC data can be combined with IMS-MS data. When incorporated, the LC device 101 provides the sample to the ionization source 102 for preparation and injection into the ion separation device 104. The present disclosure also contemplates an IMS system 100 that does not include an LC device 101, but instead performs ion mobility separation on the sample without pre-separation being conducted.

The ionization source 102 generates ions (e.g., ions having varying mobility and mass-to-charge-ratios) and injects the ions into the ion separation device 104. In particular, the ionization source 102 can provide multiple sets of ions from a cohort to the ion separation device 104 for separate analysis. In configurations of the IMS system 100 that incorporate an LC device 101, the ionization source 102 receives the sample from the LC device 101 and modifies the sample so that it is in a proper form to undergo ion mobility separation by the ion separation device 104.

The ion separation device 104 can be configured to separate the ions based on their mobility via ion mobility spectrometry (IMS). Mobility separation can be achieved, for example, by applying one or more potential waveforms (e.g., traveling potential waveforms, direct current (DC) gradient, or both) on the ions. In this regard, the ion separation device 104 can be a structure for lossless ion manipulation (SLIM) that performs IMS based mobility separation by systematically applying traveling and/or DC potential waveforms to a collection of ions. For example, the ion separation device 104 can be configured and operated in accordance with the SLIM devices disclosed and described in U.S. Pat. No. 8,835,839 entitled "Method and Apparatus for Ion Mobility Separations Utilizing Alternating Current Waveforms" and U.S. Pat. No. 10,317,364 entitled "Ion Manipulation Device," both of which are incorporated herein by reference in their entirety. Moreover, the ion separation device 104 can be configured to transfer ions, accumulate ions, store ions, and/or separate ions, depending on the desired functionality and waveforms applied thereto by the controller 110. However, it should be understood that the ion separation device 104 need not be a SLIM device, but can be any device that separates ions based on mobility. Ion mobility separation is particularly useful because it is a highly reproducible technique that has shown to have as little as 0.05% RDS (intraday) variation in ion arrival times. As such, one could potentially overlay multiple IMS-MS sample sets and expect the peaks to overlay nearly perfectly. This inherent reproducibility of ion mobility separation has particular utility with respect to IMS-MS data arrays, as it allows these data arrays to be plotted as images or videos and compared to each other, as discussed in greater detail below.

The vacuum system 108 can be in fluidic communication with the ion separation device 104 and regulate the gas pressure within the ion separation device 104. Specifically, the vacuum system 108 can provide nitrogen to the ion separation device 104 while maintaining the pressure therein at a consistent pressure. In some configurations, the ion separation device 104 can be an analytical device that does not require the use of a vacuum system.

The controller 110 can receive power from the power source 114, which can be, for example, a DC power source that provides DC voltage to the controller 110, and can be in communication with and control operation of the ionization source 102, the ion separation device 104, the detector 106, and the vacuum system 108. For example, the controller 110 can control the LC device 101, the rate of injection of ions into the ion separation device 104 by the ionization source 102, the target mobility of the ion separation device 104, and ion detection by the detector 106. In some aspects, e.g., when the ion separation device 104 is a SLIM device, the controller 110 can control the characteristics and motion of potential waveforms (e.g., amplitude, shape, frequency, etc.) generated by the ion separation device 104 (e.g., by applying RF/AC/DC potentials to the electrodes of the ion separation device 104) in order to transfer, accumulate, store, and/or separate ions.

The controller 10 can be communicatively coupled to a computer system 112. For example, the computer system 112 can provide operating parameters of the IMS system 100 via a control signal to the master control circuit. In some implementations, a user can provide the computer system 112 (e.g., via a user interface) with the operating parameters. Additionally, the computer system 112 can include a plotting module 116, an image/video analysis module 118, and a statistical analysis module 120.

Figure 2A:
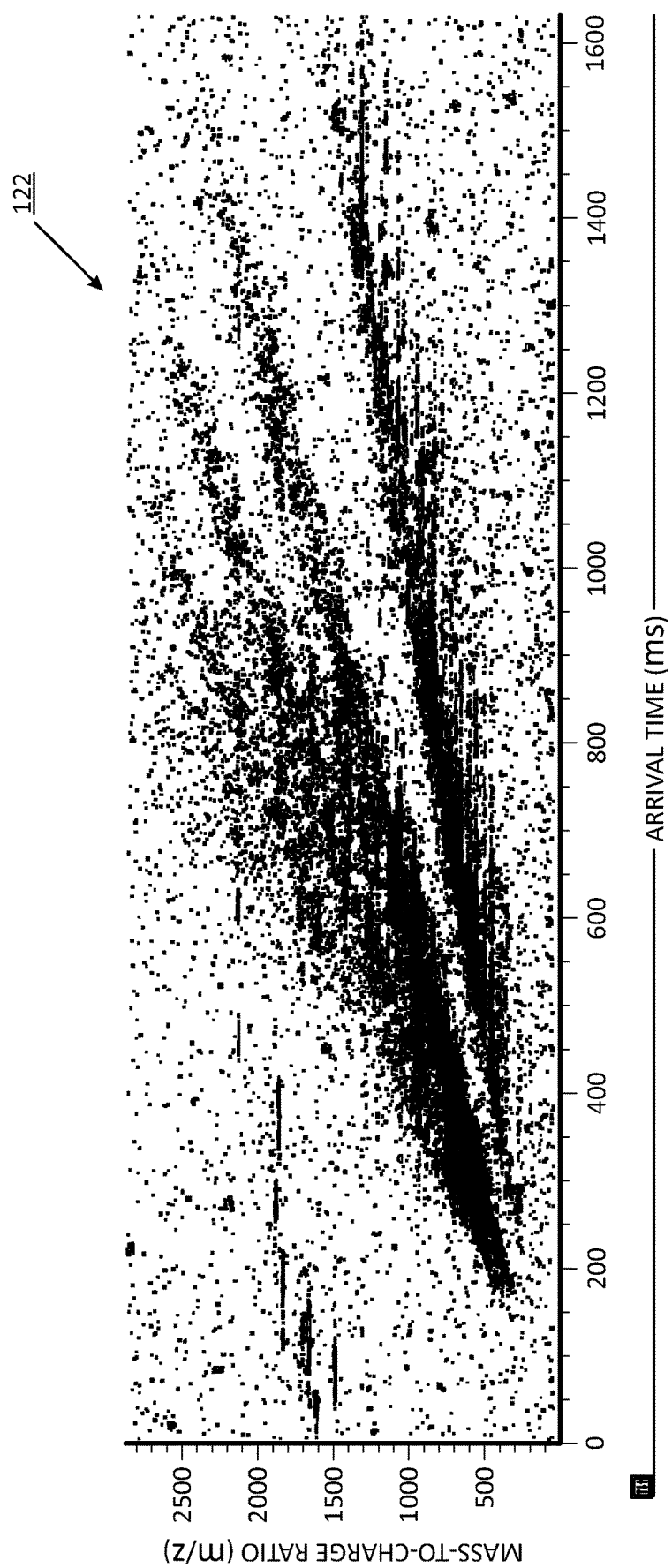
FIGS. 2*a* and 2*b* are three-dimensional plots of mass-to-charge ratio (m/z) versus arrival time and peak intensity binned to a color map for a sample of ions.
Figure 2B:
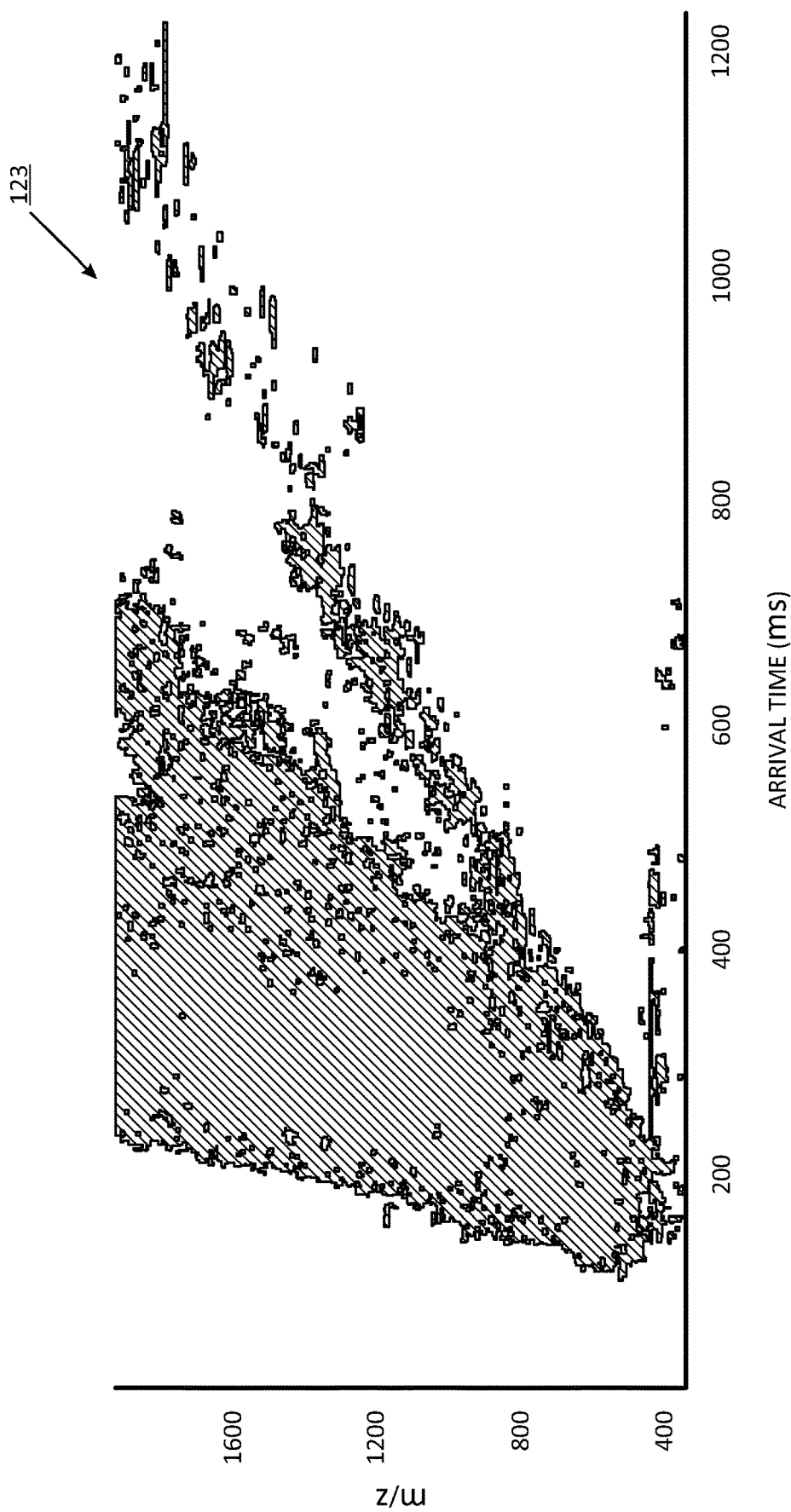
Figure 2C:
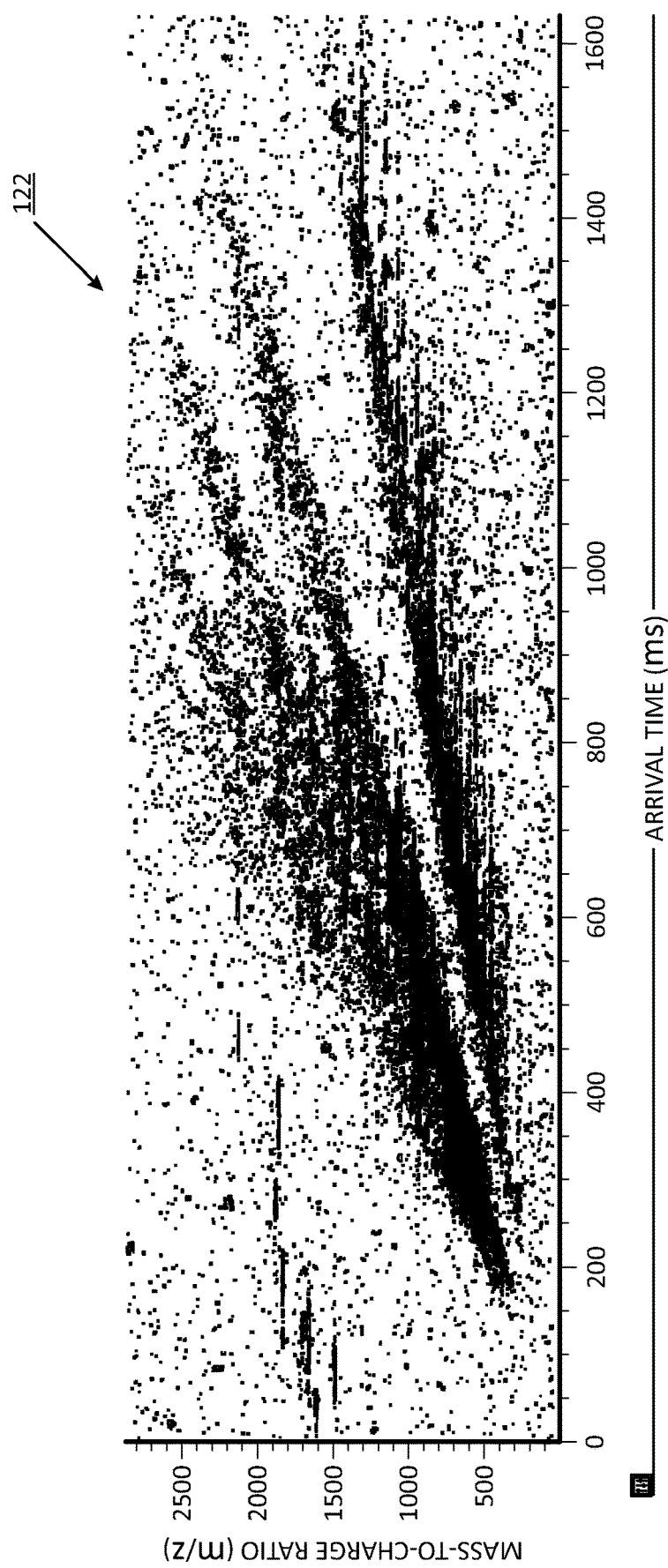
FIGS. 2*c* and 2*d* are gray scale reproductions of FIGS. 2*a* and 2*b*, respectively.
Figure 2D:
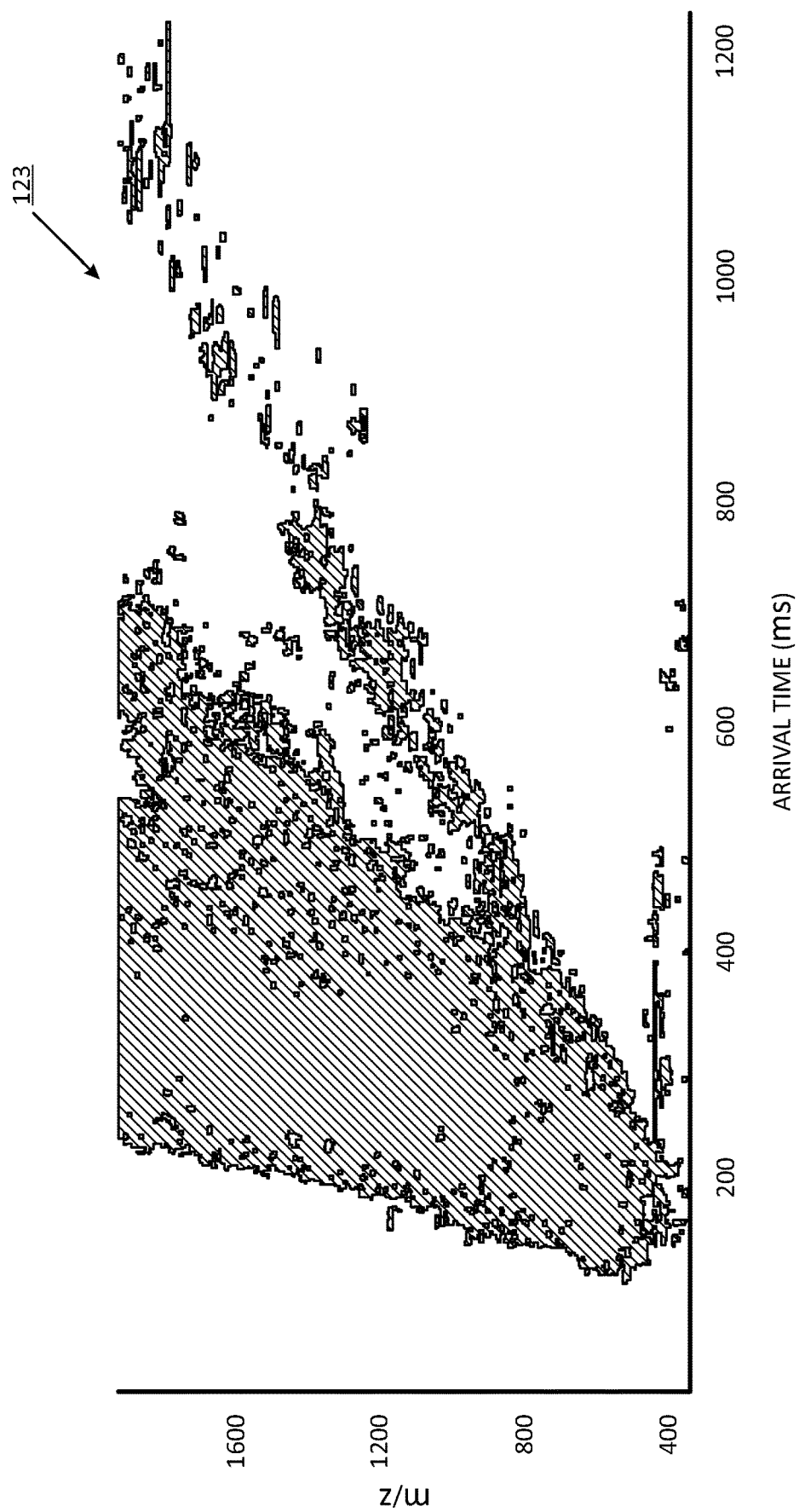

The computer system 112 is configured to receive data from the detector 106 for the detected ions, e.g., from individual samples. In particular, the ion separation device 104 can be configured to sequentially receive and separate different samples of a cohort, the detector 106 receives and detects the ions of each sample, and the computer system 112 receives the detection data from the detector 106 for each sample. The plotting module 116 of the computer system 112 receives the sample data, e.g., a three- or four-dimensional data array, and generates one or more data plots 122, 123 based on the data. The data plot 122, 123 can be a three-dimensional plot, such as the plots 122, 123 shown and described in connection with FIGS. 2*a-d* which are plots of mass-to-charge ratio (m/z) versus arrival time (ms) with peak intensity binned to a color map. That is, the color hue and/or color intensity of each data point in the plot 122 of FIGS. 2*a* and 2*c*, and the plot 123 of FIGS. 2*b* and 2*d* is reflective of the peak intensity for each mass-to-charge ratio versus arrival time data point. The data plots 122, 123, e.g., the data plots 122, 123 for each sample of FIGS. 2*a-d*, can be generated by the plotting module 116 as an image or a video and provided to the image/video analysis module 118.

The image/video analysis module 118 receives the data plots 122, 123, e.g., as images or videos, from the plotting module 116 and can compare the data plots 122, 123 of each sample to the data plots 122, 123 of the other samples, or compare the data plot 122, 123 of each sample to a reference image. In particular, the image/video analysis module 118 determines the differences between the two images/videos being compared, e.g., differences in intensity of each point/pixel or the addition of new data points that are representative of new signal peaks, and generates a delta dataset from the comparison. This can be achieved, for example, by comparing each pixel of the two images and generating a delta dataset that is representative of the differences between the two data plots 122, 123, e.g., the color value for each pixel of one data plot can be compared and subtracted from the color value for the corresponding pixel of a second data plot. The delta dataset can be a dataset or a new image, e.g., a "difference" map, that is representative of the differences between the compared data plots 122, 123. The delta dataset can then be analyzed, e.g., automatically or provided to a user for manual analysis, to determine the class or classes of compounds that correlate to the areas of difference between the data plots 122, 123, which is possible at least because compound classes tend to group to distinct regions of the m/z versus arrival time plot.

Alternatively, where data plots 122, 123 for multiple different samples of a cohort are compared to a reference data plot/image, and delta datasets are generated for each data plot 122, 123, the delta datasets can be provided to the statistical analysis module 120, which can perform a statistical analysis on the delta datasets to determine the areas of the data plots 122, 123 that are most significantly different from the reference data plot. For example, the statistical analysis module 120 can implement a statistical analysis tool that performs a principal component analysis (PCA) on the delta datasets.

Figure 3:
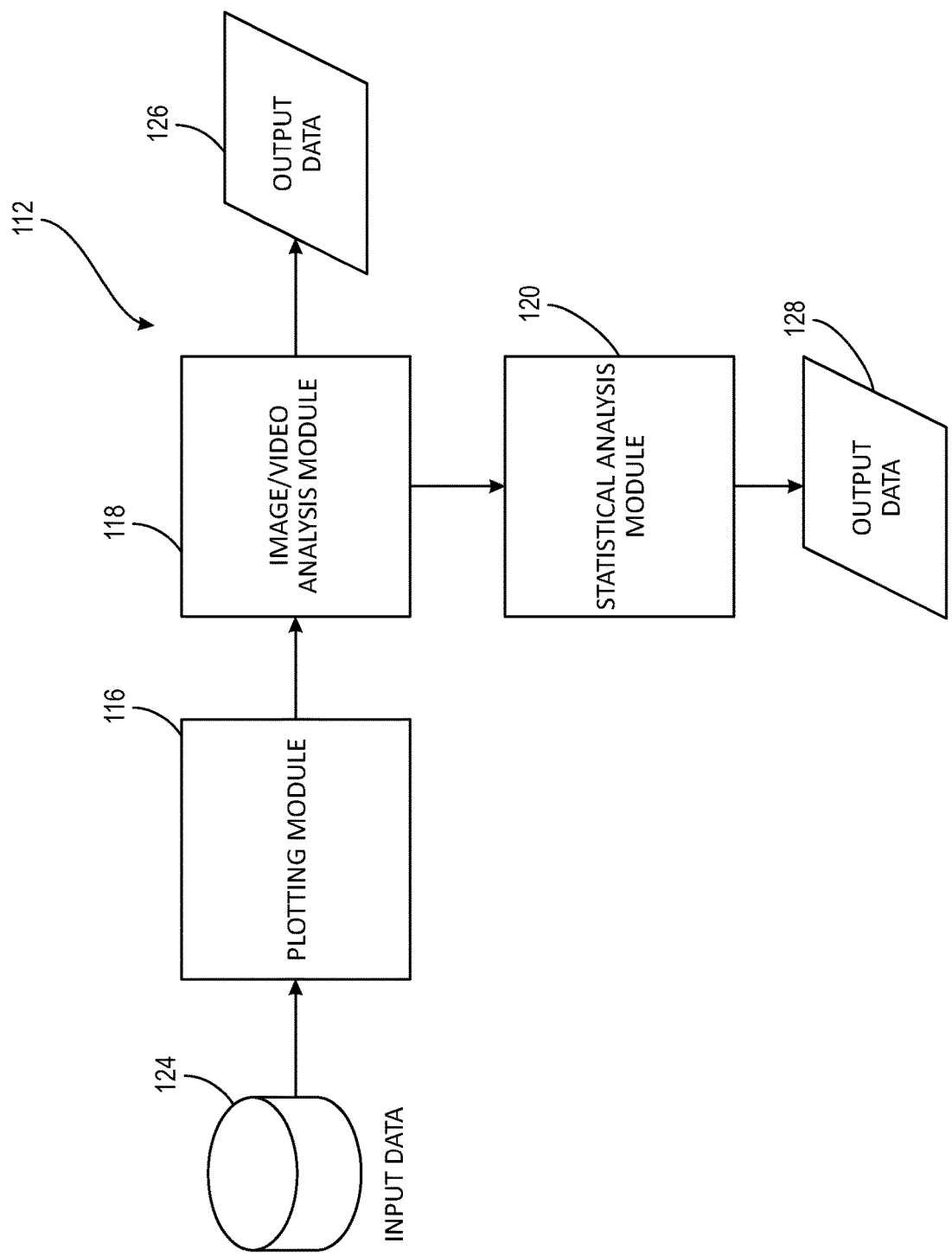
FIG. 3 is a diagram illustrating the flow of data of the present disclosure.

FIG. 3 is a diagram illustrating the flow of data of the present disclosure. First, the computer system 112 receives detector input data 124 from the detector 106. The detector input data 124 is generated and provided by the detector 106, and can be a 3-dimensional or 4-dimensional data array that includes the arrival time and mass-to-charge ratio of each detected ion of the sample being analyzed at that time. It is noted that the detector 106 accumulates the input data over a period of time, e.g., 30 seconds, and the entirety of the data for that time period is summed together to form the input data 124. However, the detection time period can be divided into frames, groupings, or time-period slices, e.g., 20 frames or one frame per 1.5 seconds, with each frame including the data obtained up to that point in time or during that frame's time period. This is of particular utility when an LC device 101 is incorporated into the IMS system 100, as discussed in greater detail below. The detector input data 124 is provided to the plotting module 116, which generates the data plot 122, 123 from the detector input data 124 for each sample that is analyzed by the detector 106. As shown and described in connection with FIGS. 2a-d, the data plot 122, 123 is a three-dimensional plot of mass-to-charge ratio (m/z) versus arrival time with peak intensity binned to a color map and can be provided as an image. Alternatively, if the input data is divided into groupings, as discussed above, a data plot for each grouping and time period, e.g., frame, can be generated by the plotting module 116 as an image and the images can be combined into a video that is a time lapse of the data detected by the detector 106. Each data plot 122, 123, which can be an image or a video, is then provided to the image/video analysis module 118 for analysis.

In particular, in a first aspect, the image/video analysis module 118 compares the data plots 122, 123 for two different samples to each other by performing a pixel-by-pixel comparison for the two data plots 122, 123 and determines the differences between the two data plots 122, 123 which can be differences in color hue, color intensity, the addition of a new data point, etc. In the case of video analysis, the individual frames of each video can be compared and analyzed, or the videos as a whole can be compared and analyzed. The image/video analysis module 118 then generates a delta dataset that is representative of the differences between the compared data plots 122, 123 and which can be a dataset, e.g., a listing or chart of the difference values for all relevant mass-to-charge ratios versus corresponding arrival times, a new "difference" map image showing the differences as a plot of mass-to-charge ratio versus arrival time, or a new "difference" map video showing the differences as a plot of mass-to-charge ratio versus arrival time as a time lapse over the detection period. The delta dataset can then be provided to a user as output data 126 for further analysis. For example, a user can determine the class or classes of compounds that correlate to the output data 126.

In a second aspect, the image/video analysis module 118 receives a data plot 122, 123, e.g., image or video, for each of a plurality of different samples of a sample cohort, compares each data plot 122, 123 to a reference data plot, determines the differences between each data plot 122, 123 and the reference data plot, and generates a delta dataset for each comparison, e.g., for each sample of the sample cohort. As explained above, this comparison can be done on a pixel-by-pixel basis to determine the differences between each data plot 122, 123 and the reference data plot, and, in the case of video analysis, the individual frames of each video can be compared and analyzed, or the videos as a whole can be compared and analyzed. The delta datasets are provided to the statistical analysis module 120 which performs a statistical analysis on all of the delta datasets and determines the areas of the data plots that are most significantly different from the reference plot. The statistical analysis module 120 generates output data 128 based on the analysis and provides the output data 128 to a user. The output data 128 can be a dataset, e.g., a listing or chart of the difference values for all relevant mass-to-charge ratios versus corresponding arrival times, or a plot of mass-to-charge ratio versus arrival time illustrating the areas of the data plots that are most significantly different from the reference plot. The output data 128 can then be utilized to determine the class or classes of compounds that correlate to the regions of the data plots 122, 123 that have the greatest statistical difference with respect to the reference plot.

The computer system 112 can also analyze the delta dataset, and provide additional output or reports beyond the delta dataset as the output data 126, 128. For example, for each of the samples the computer system 112 can identify the sample type and assign the sample to a particular group, e.g., lipids, peptides, carbohydrates, nucleotides, etc. Alternatively, if the number of groups or type of groups is known a priori for the analyzed samples then the computer system 112 can assign each of the samples to the known reference groups based on the delta dataset. Additionally, the computer system 112 can identify data features that are present, absent, fold change across samples or sample groups/sets/cohorts. The foregoing information can be provided to the user as the output data 126, 128. Once unique features are identified, a user can review the raw data or collect new data to identify the chemical signature.

Since the entire plot of mass-to-charge ratio versus arrival time is used in the foregoing analyses, the determinations are achieved in a completely untargeted manner, which leads to a faster interpretation of data and the ability to tailor targeted analyses for future experiments. Moreover, since the foregoing comparisons and analysis are based on images and/or videos instead of the raw data, less processing power and memory is required by the computer system 112.

Figure 4:
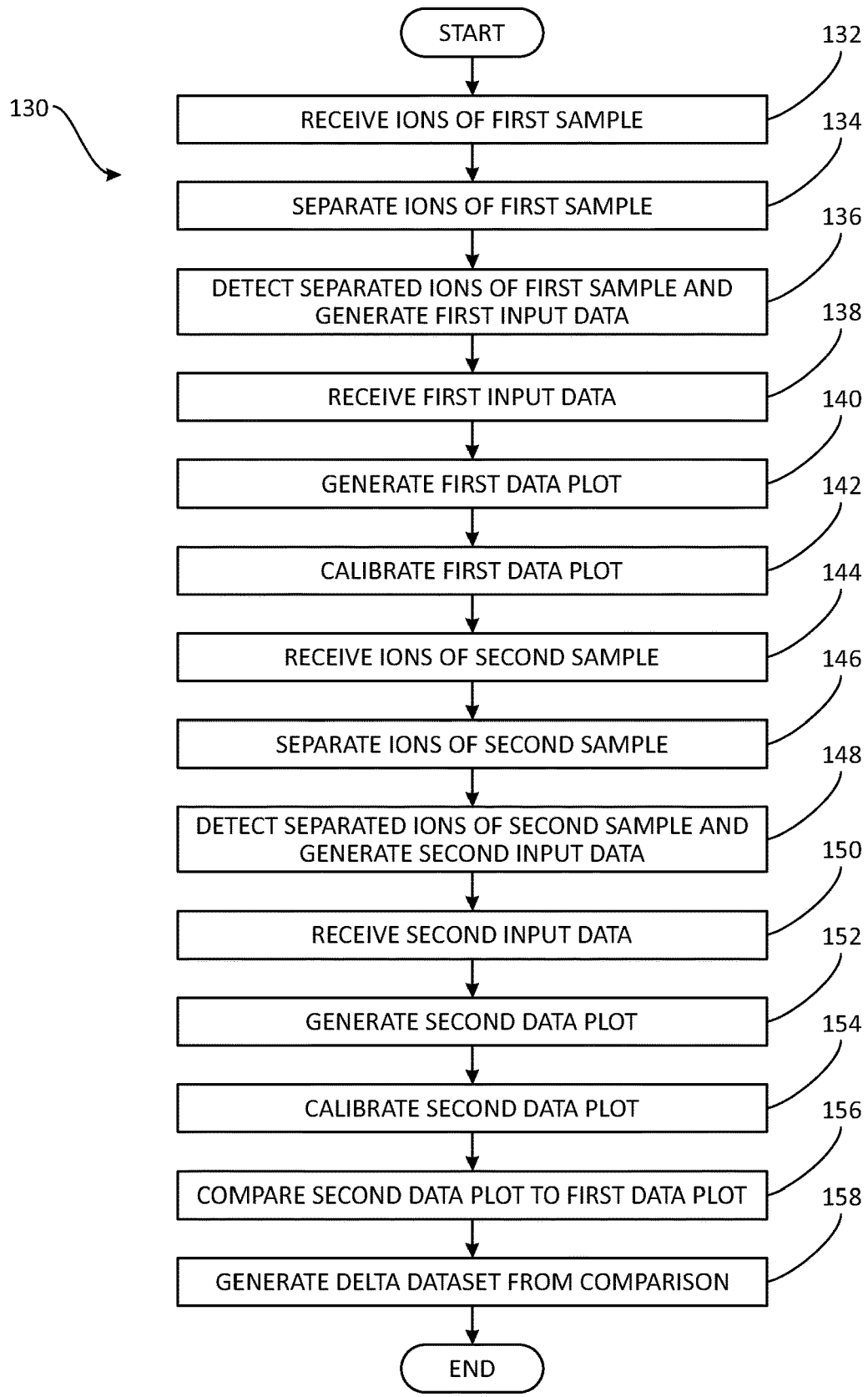
FIG. 4 is a flowchart illustrating overall processing steps carried out by the system of the present disclosure for comparing two samples.

FIG. 4 is a flowchart 130 illustrating overall processing steps carried out by the system 100 of the present disclosure for comparing two or more samples. First, in step 132 the ion separation device 104 receives ions of a first sample from the ionization source 102. Next, in step 134, the ion separation device 104 separates the ions of the first sample. The ion separation device 104 can separate the ions based on mobility utilizing any method known in the art. For example, as discussed above, the ion separation device 104 can be a structure for lossless ion manipulation (SLIM) that performs IMS based mobility separation by systematically applying traveling and/or DC potential waveforms to a collection of ions. In step 136, the detector 106 receives and detects the separated ions of the first sample and generates first input data, which can be a 3- or 4-dimensional data array representative of the mass-to-charge ratio and arrival time of the detected ions. In step 138, the computer system 112 receives the first input data from the detector 106. In step 140, the plotting module 116 generates a first data plot based on the first input data received from the detector 106. The first data plot can be a three-dimensional plot of mass-to-charge ratio (m/z) versus arrival time with peak intensity binned to a color map and can be provided as an image, as shown and described in connection with FIGS. 2a-d, or as a time-lapse video, as described above. In step 142, the computer system 112 optionally calibrates the first data plot so that it can be accurately compared with other data plots. It should be understood that the term calibrate as used herein also encompasses data plot optimization. For example, the data plots can undergo denoising in which non-useful peaks or data points are removed, normalization (e.g., MS peak intensity normalization, gain normalization, etc.), image alignment, etc. Additionally, the foregoing calibration and optimization techniques can be applied to the first input data itself.

In step 144, the ion separation device 104 receives ions of a second sample from the ionization source 102. The second sample of ions can be from the same cohort as the first sample. Additionally, in some aspects, the first sample of ions can be a healthy sample, while the second sample of ions can be a disease sample. Next, in step 146, the ion separation device 104 separates the ions of the second sample. The ion separation device 104 can separate the ions of the second sample using the same method implemented for the first sample. In step 148, the detector 106 receives and detects the separated ions of the second sample and generates second input data that includes the same measurements/attributes as the first input data, but for the second sample. In step 150, the computer system 112 receives the second input data from the detector 106. In step 152, the plotting module 116 generates a second data plot based on the second input data received from the detector 106. The second data plot is provided in the same fashion as the first data plot so that the two data plots can be compared, e.g., as an image or a video. In step 154, the computer system 112 optionally calibrates the second data plot so that it can be accurately compared with the first data plot or subsequent data plots. It should be understood that both the first and second data plots need not be calibrated. Instead, it is contemplated by the present disclosure that only one of the first and second data plots is calibrated or, alternatively, neither the first nor the second data plot is calibrated.

In step 156, the first and second data plots are compared by the image/video analysis module 118, and in step 158 the image/video analysis module 118 generates a delta dataset from the comparison that is representative of the differences between the first and second data plots. The image/video analysis module 118 compares the first and second data plots by performing a pixel-by-pixel comparison to determine differences, e.g., in the color, of each pixel. In some instances, this may be a change in the hue or intensity of the pixel color, which can represent a difference in peak intensity between the two samples for the mass-to-charge ratio and arrival time corresponding to that particular pixel, while in other instances this can be the addition or removal of color in a pixel, which can represent a peak that is present in one of the first and second samples but not in the other sample.

The computer system 112 can also analyze the delta dataset, and provide additional output or reports beyond the delta dataset. For example, for each of the samples the computer system 112 can identify the sample type and assign the sample to a particular group, e.g., lipids, peptides, carbohydrates, nucleotides, etc. Alternatively, if the number of groups or type of groups is known a priori for the analyzed samples then the computer system 112 can assign each of the samples to the known reference groups based on the delta dataset. Additionally, the computer system 112 can identify data features that are present, absent, fold change across samples or sample groups/sets. The foregoing information can be output to the user. Once unique features are identified, a user can review the raw data or collect new data to identify the chemical signature.

It should be understood that the foregoing processing steps discussed in connection with FIG. 4 can be performed on more than two samples, e.g., three, four, etc. For example, a third sample could be analyzed in similar fashion to the first and second samples, and compared with the first and/or second samples to determine the differences there between.

Figure 5:
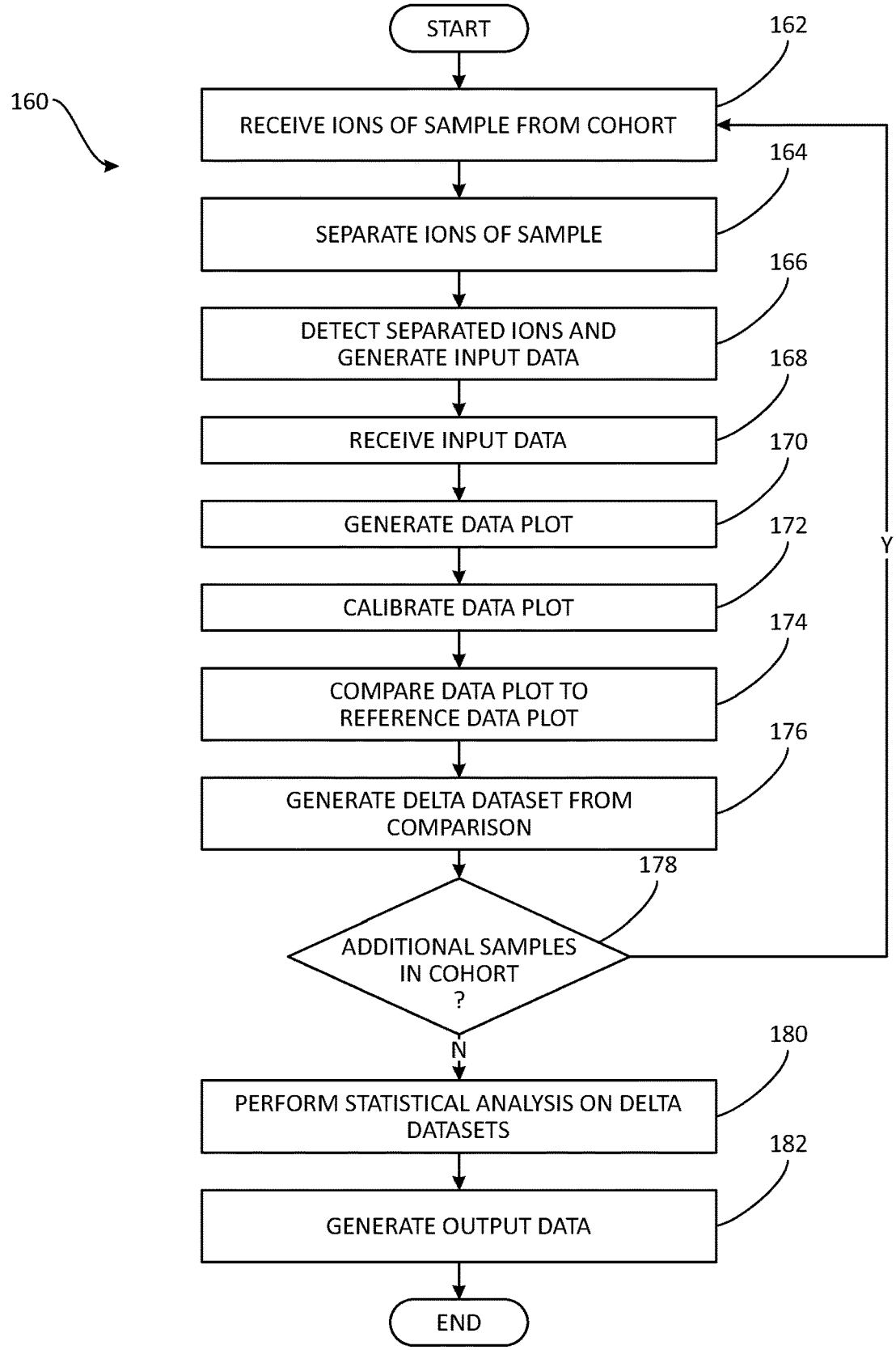
FIG. 5 is a flowchart illustrating overall processing steps carried out by the system of the present disclosure for comparing one or more samples of a cohort to a reference data plot.

FIG. 5 is a flowchart 160 illustrating overall processing steps carried out by the system 100 of the present disclosure for comparing one or more samples of a cohort to a reference data plot. First, in step 162 the ion separation device 104 receives ions of a sample from the ionization source 102. The sample provided to, and received by, the ionization source 102 can be a sample from a cohort having a plurality of samples. Next, in step 164, the ion separation device 104 separates the ions of the sample. The ion separation device 104 can separate the ions based on mobility utilizing any method known in the art. For example, as discussed above, the ion separation device 104 can be a SLIM device that performs IMS based mobility separation by systematically applying traveling and/or DC potential waveforms to a collection of ions.

In step 166, the detector 106 receives and detects the separated ions of the sample and generates input data, which can be a 3- or 4-dimensional data array representative of the mass-to-charge ratio and arrival time of the detected ions. In step 170, the computer system 112 receives the input data from the detector 106 for the particular sample that has been analyzed by the detector 106. In step 170, the plotting module 116 generates a data plot based on the input data received from the detector 106. The data plot can be a three-dimensional plot of mass-to-charge ratio (m/z) versus arrival time with peak intensity binned to a color map and can be provided as an image, as shown and described in connection with FIGS. 2a-d, or as a time-lapse video, as described above. In step 172, the computer system 112 optionally calibrates the data plot so that it can be accurately compared with a reference data plot. It should be understood that it is also contemplated by the present disclosure that the data plot does not undergo a calibration procedure. Moreover, as noted previously, it should be understood that the term calibrate as used herein also encompasses data plot optimization. For example, the data plot can undergo denoising in which non-useful peaks or data points are removed, normalization (e.g., MS peak intensity normalization, gain normalization, etc.), image alignment, etc. Additionally, the foregoing calibration and optimization techniques can be applied to the input data.

Next, in step 174, the data plot is compared by the image/video analysis module 118 to a reference data plot, and in step 176 the image/video analysis module 118 generates a delta dataset from the comparison. The reference data plot can be, for example, a previously generated data plot for a known healthy sample and provided as an image or video. The image/video analysis module 118 compares the data plot for the sample to the reference data plot by performing a pixel-by-pixel comparison to determine differences in the color of each pixel, as described in detail above.

In step 178, a determination is made as to whether there are additional samples in the sample cohort that require analysis. If it is determined that there are additional samples in the cohort, then the process returns to step 162 and performs steps 162-176 for the next sample in the cohort. This cycle continues until it is determined that there are no more samples in the sample cohort that require analysis. Accordingly, steps 162-176 are performed for each sample of the sample cohort, and thus a delta dataset is generated for each sample of the sample cohort. Next, in step 180, the statistical analysis module 120 performs a statistical analysis on all of the delta datasets together. In particular, the statistical analysis module 120 analyzes the delta datasets and determines the areas of the data plots that are most significantly different from the reference plot. For example, a principal component analysis can be applied to the delta datasets. In step 182, output data is generated, which can be provided to a user for further analysis.

The computer system 112 can also analyze the delta datasets and output data, and provide additional output or reports beyond the delta dataset and output data. For example, for each of the samples from the cohort the computer system 112 can identify the sample type and assign the sample to a particular group, e.g., lipids, peptides, carbohydrates, nucleotides, etc. This information can be output to the user. Alternatively, if the number of groups or type of groups is known for the analyzed samples, e.g., a priori, then the computer system 112 can assign each of the samples to the known reference groups based on the delta dataset. Additionally, the computer system 112 can identify data features that are present, absent, fold change across samples or sample groups/sets. Once unique features are identified, a user can review the raw data or collect new data to identify the chemical signature.

As previously described, the IMS system 100 can include an LC device 101 that performs a pre-separation of the samples prior to introduction into the ion separation device 104 by the ionization source 102. The LC device 101 performs the pre-separation over a period of time, e.g., an elution time period, and transfers the separated components to the ionization source 102 over this elution time period. Accordingly, the entire sample is not introduced into the ion separation device 104 at the same time, but instead over a time period. Additionally, LC data can be associated with the sample as it is eluted, including, for example, an elution profile showing the amount of material that is carried through the LC device 101 column during the elution time period.

In some instances, the LC process can result in certain components being received by the ion separation device 104 at different times between samples. That is, in one sample a first component may pass through the column after 10 seconds of the elution time period, while in a second sample the first component may pass through the column after 20 seconds of the elution time period. These differences are not immediately evident or illustrated in an image of the IMS-MS data array, e.g., the data provided by the detector 106, at least because, as previously noted, the data from the detector 106 is summed after the entirety of the sample ions are detected upon traversing the ion separation device 104. In particular, as described above, the sample ions undergo ion mobility separation as they traverse the ion separation device 104, and are detected by the detector 106 over a detection period, e.g., 30 seconds, and the entirety of the data for that time period is summed together. Therefore, it would not be evident from the summed data that a first component in the first sample may have been detected by the detector 106 earlier in the detection period than the first component of the second sample, e.g., because the first component of the first sample passed through the LC device 101 more quickly than the first component of the second sample.

However, the detection time period can be divided into frames or time-period slices, e.g., 20 frames or one frame per 1.5 seconds, with each frame including the data obtained up to that point in time or during that frame's time period as a grouping, which would allow for the foregoing LC disparities between samples to be determined. For example, if the detection time period is divided into frames and the data is divided into groupings, then a data plot for each frame and associated data grouping can be generated by the plotting module 116 as an image and the frames from different samples can be compared. In this regard, the same frames (e.g., for the same detection time period) from different samples can be compared or different frames (e.g., for different detection time periods) from different samples can be compared. Alternatively, the images, e.g., corresponding to each frame, for each sample can be combined into a video that is a time lapse of the data detected by the detector 106. The videos for two different samples can be compared by the image/video analysis module 118 to determine differences during the entire span of the detector's 106 detection time. For example, by comparing the videos, the image/video analysis module 118 could determine that a certain component appears or disappears over time, or that a component or feature appears in a certain frame of the first sample, but does not appear until a later frame in the second sample. Thus, pixel intensity/color with respect to time has increased importance and utility. This analysis can be conducted in the same fashion as described in connection with FIGS. 4 and 5.

By comparing data plots, e.g., image/video comparisons, as opposed to utilizing four dimensional data sets (e.g., LC, IMS, MS, and intensity) that require substantial memory usage and processing power, the foregoing aspects increase the speed and efficiency of the computer system 112, as well as reduce the processing requirements and memory usage of the computer system 112.

Figure 6:
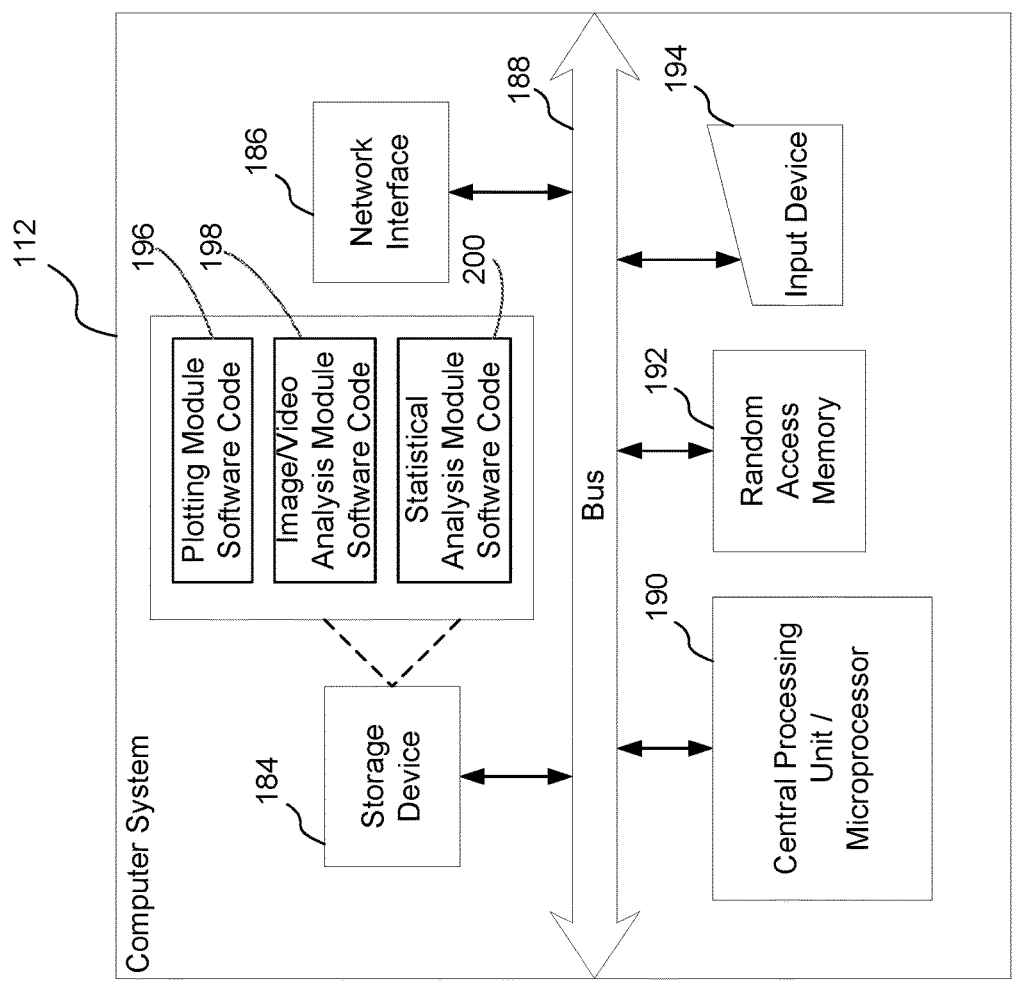
FIG. 6 is a diagram illustrating hardware and software components capable of being utilized to implement embodiments of the system of the present disclosure.

FIG. 6 is a diagram illustrating hardware and software components of the computer system 112 capable of being utilized to implement embodiments of the present disclosure. The computer system 112 can include a storage device 184, a network interface 186, a communications bus 188, a central processing unit (CPU) (microprocessor) 190, random access memory (RAM) 192, and one or more input devices 194, such as a keyboard, mouse, etc. It is noted that the CPU 190 could also include, or be configured as, one or more graphics processing units (GPUs). The computer system 112 could also include a display (e.g., liquid crystal display (LCD), cathode ray tube (CRT), and the like). The storage device 184 could comprise any suitable computer-readable storage medium, such as a disk, non-volatile memory (e.g., read-only memory (ROM), erasable programmable ROM (EPROM), electrically-erasable programmable ROM (EEPROM), flash memory, field-programmable gate array (FPGA), and the like). Additionally, the storage device 184 can store plotting module software code 196 for operation of the plotting module 116, image analysis module software code 198 for operation of the image/video analysis module 118, and statistical analysis module software code 200 for operation of the statistical analysis module 120. The computer system 112 could be a networked computer system, a personal computer, a server, a smart phone, tablet computer, etc. It is noted that the computer system 112 need not be a networked computer system, and indeed, could be a stand-alone computer system.

The functionality provided by the present disclosure could be provided by the plotting module software code 196, the image analysis module software code 198, and the statistical analysis module software code 200, which each could be embodied as computer-readable program code (e.g., algorithm) stored on the storage device 184 and executed by the CPU 190 using any suitable, high or low level computing language, such as Python, Java, C, C++, C #, .NET, MATLAB, etc. The network interface 186 could include an Ethernet network interface device, a wireless network interface device, or any other suitable device which permits the computer system 112 to communicate via a network. The CPU 190 could include any suitable single-core or multiple-core microprocessor of any suitable architecture that is capable of implementing and running the plotting module software code 196, the image analysis module software code 198, and the statistical analysis module software code 200 (e.g., Intel processor). The random access memory 192 could include any suitable, high-speed, random access memory typical of most modern computers, such as dynamic RAM (DRAM), etc.

Other embodiments are within the scope and spirit of the disclosed subject matter. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. Further, in the present disclosure, like-named components of the embodiments generally have similar features, and thus within a particular embodiment each feature of each like-named component is not necessarily fully elaborated upon.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor can receive instructions and data from a read-only memory or a random access memory or both. The essential elements of a computer are a processor for executing instructions and one or more memory devices for storing instructions and data. Generally, a computer can also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The invention claimed is:

1. A system for image processing of mass spectrometry data, comprising:
   an ion mobility separation device configured to receive a first sample of ions, guide the ions of the first sample through the ion mobility separation device, separate the ions of the first sample based on ion mobility, receive a second sample of ions, guide the ions of the second sample through the ion mobility separation device, and separate the ions of the second sample based on ion mobility;
   an ion detector configured to receive the ions of the first sample from the ion mobility separation device, detect the ions of the first sample, generate first input data based on the detected ions of the first sample, receive the ions of the second sample from the ion mobility separation device, detect the ions of the second sample, and generate second input data based on the detected ions of the second sample; and
   a computer system configured to generate a first data plot based on the first input data, generate a second data plot based on the second input data, compare the first data plot to a reference data plot, generate a first delta dataset based on the comparison of the first data plot to the reference data plot, generate a second delta dataset based on the comparison of the second data plot to the reference data plot, perform a statistical analysis on the first delta dataset and the second delta dataset, and generate output data based on the statistical analysis,
   wherein the first delta dataset is representative of the differences between the first data plot and the reference data plot, and the second delta dataset is representative of the differences between the second data plot and the reference data plot,
   wherein the first data plot is a first image or a first video, the second data plot is a second image or a second video, the reference data plot is a third image or a third video, and the computer system is configured to compare the first data plot to the reference data plot by performing an image analysis or a video analysis and compare the second data plot to the reference data plot by performing an image analysis or a video analysis.

2. The system of claim 1, wherein the statistical analysis is a principal component analysis.

3. The system of claim 1, wherein the statistical analysis determines the portions of the first data plot and the second data plot that are most significantly different from the reference data plot.

4. The system of claim 1, wherein the first input data is a first three-dimensional data array or four-dimensional data array, and the second input data is a second three-dimensional data array or four-dimensional data array.

5. The system of claim 4, wherein the first and second data plots are plots of mass-to-charge ratio versus arrival time with peak intensity binned to a color map.

6. The system of claim 1, wherein the computer system is configured to perform a pixel-by-pixel comparison between the first data plot and the reference data plot, and between the second data plot and the reference data plot.

7. The system of claim 1, wherein the computer system includes a plotting module configured to generate the first data plot and the second data plot.

8. The system of claim 1, wherein the computer system includes an image/video analysis module configured to compare the first data plot to the reference data plot, and the second data plot to the reference data plot.

9. The system of claim 1, wherein the computer system includes a statistical analysis module configured to perform the statistical analysis on the first delta dataset and the second delta dataset.

10. The system of claim 1, wherein the computer system is configured to calibrate one or more of the first data plot and the second data plot.

11. The system of claim 1, wherein the first input data is divided into a first plurality of groupings and the second input data is divided into a second plurality of groupings, and
   wherein the computer system is configured to generate the first data plot based on at least one grouping of the first plurality of groupings and generate the second data plot based on at least one grouping of the second plurality of groupings.

12. The system of claim 1, comprising a liquid chromatography device configured to receive the first sample, chemically separate the first sample, receive the second sample, and chemically separate the second sample,
   wherein the first sample of ions received by the ion mobility separation device are generated from the chemically separated first sample, and the second sample of ions received by the ion mobility separation device are generated from the chemically separated first sample.

13. A system for image processing of mass spectrometry data, comprising:
   a processor in communication with a storage device; and
   computer system code executed by the processor, the computer system code causing the processor to:
      generate a first data plot based on first input data related to a first sample of ions;
      generate a second data plot based on second input data related to a second sample of ions;
      compare the first data plot to a reference data plot;
      generate a first delta dataset based on the comparison of the first data plot to the reference data plot, the first delta dataset being representative of the differences between the first data plot and the reference data plot;
      compare the second data plot to the reference data plot;
      generate a second delta dataset based on the comparison of the second data plot to the reference data plot, the second delta dataset being representative of the differences between the second data plot and the reference data plot;
      perform a statistical analysis on the first delta dataset and the second delta dataset; and
      generate output data based on the statistical analysis,
   wherein the first data plot is a first image or a first video, the second data plot is a second image or a second video, the reference data plot is a third image or a third video, and the comparisons performed by the computer system code are image analysis or video analysis comparisons.

14. The system of claim 13, wherein the statistical analysis is a principal component analysis.

15. The system of claim 13, wherein the statistical analysis determines the portions of the first data plot and the second data plot that are most significantly different from the reference data plot.

16. The system of claim 13, wherein the first input data is a first three-dimensional data array or four-dimensional data array, and the second input data is a second three-dimensional data array or four-dimensional data array.

17. The system of claim 13, wherein the computer system code compares the first data plot to the reference data plot on a pixel-by-pixel basis, and compares the second data plot to the reference data plot on a pixel-by-pixel basis.

18. The system of claim 13, comprising:
an ion mobility separation device configured to receive a first sample of ions, guide the ions of the first sample through the ion mobility separation device, separate the ions of the first sample based on ion mobility, receive a second sample of ions, guide the ions of the second sample through the ion mobility separation device, and separate the ions of the second sample based on ion mobility; and
an ion detector configured to receive the ions of the first sample from the ion mobility separation device, detect the ions of the first sample, generate first input data based on the detected ions of the first sample, receive the ions of the second sample from the ion mobility separation device, detect the ions of the second sample, and generate second input data based on the detected ions of the second sample.

19. The system of claim 13, wherein the first input data is divided into a first plurality of groupings and the second input data is divided into a second plurality of groupings, and
wherein the computer system code causes the processor to:
generate the first data plot based on at least one grouping of the first plurality of groupings; and
generate the second data plot based on at least one grouping of the second plurality of groupings.

20. The system of claim 13, wherein the first video is a combination of the first plurality of groupings with each grouping of the first plurality of groupings being at least one frame of the first video, and the second video is a combination of the second plurality of groupings with each grouping of the second plurality of groupings being at least one frame of the second video.

21. A method for image processing of mass spectrometry data, comprising:
generating a first data plot based on first input data related to a first sample of ions, the first data plot being a first image or a first video;
generating a second data plot based on second input data related to a second sample of ions, the second data plot being a second image or a second video;
comparing the first data plot to a reference data plot;
generating a first delta dataset based on the comparison of the first data plot to the reference data plot, the first delta dataset being representative of the differences between the first data plot and the reference data plot;
comparing the second data plot to the reference data plot;
generating a second delta dataset based on the comparison of the second data plot to the reference data plot, the second delta dataset being representative of the differences between the second data plot and the reference data plot;
performing a statistical analysis on the first delta dataset and the second delta dataset; and
generating output data based on the statistical analysis.

22. The method of claim 21, wherein the statistical analysis is a principal component analysis.

23. The method of claim 21, wherein the statistical analysis determines the portions of the first data plot and the second data plot that are most significantly different from the reference data plot.

24. The method of claim 21, wherein the first input data is a first three- dimensional data array or four-dimensional data array, and the second input data is a second three-dimensional data array or four-dimensional data array.

25. The method of claim 21, wherein the step of comparing the first data plot to the reference data plot includes comparing the first data plot to the reference data plot on a pixel-by-pixel basis, and the step of comparing the second data plot to the reference data plot includes comparing the second data plot to the reference data plot on a pixel-by-pixel basis.

26. The method of claim 21, comprising:
receiving, by an ion mobility separation device, the first sample of ions;
guiding the ions of the first sample through the ion mobility separation device;
separating the ions of the first sample based on ion mobility;
receiving, at an ion detector, the ions of the first sample;
detecting, by the ion detector, the ions of the first sample;
generating the first input data based on the detected ions of the first sample;
receiving, by the ion mobility separation device, the second sample of ions;
guiding the ions of the second sample through the ion mobility separation device;
separating the ions of the second sample based on ion mobility;
receiving, at the ion detector, the ions of the second sample;
detecting, by the ion detector, the ions of the second sample; and
generating second input data based on the detected ions of the second sample.

27. The method of claim 21, comprising:
chemically separating a first sample with a liquid chromatography device; and
chemically separating a second sample with the liquid chromatography device,
wherein the first sample of ions received by the ion mobility separation device are generated from the chemically separated first sample, and the second sample of ions received by the ion mobility separation device are generated from the chemically separated first sample.

28. The method of claim 21, wherein the first input data is divided into a first plurality of groupings and the second input data is divided into a second plurality of groupings, and
comprising:
generating the first data plot based on at least one grouping of the first plurality of groupings; and
generating the second data plot based on at least one grouping of the second plurality of groupings.

* * * * *